UNITED STATES PATENT OFFICE.

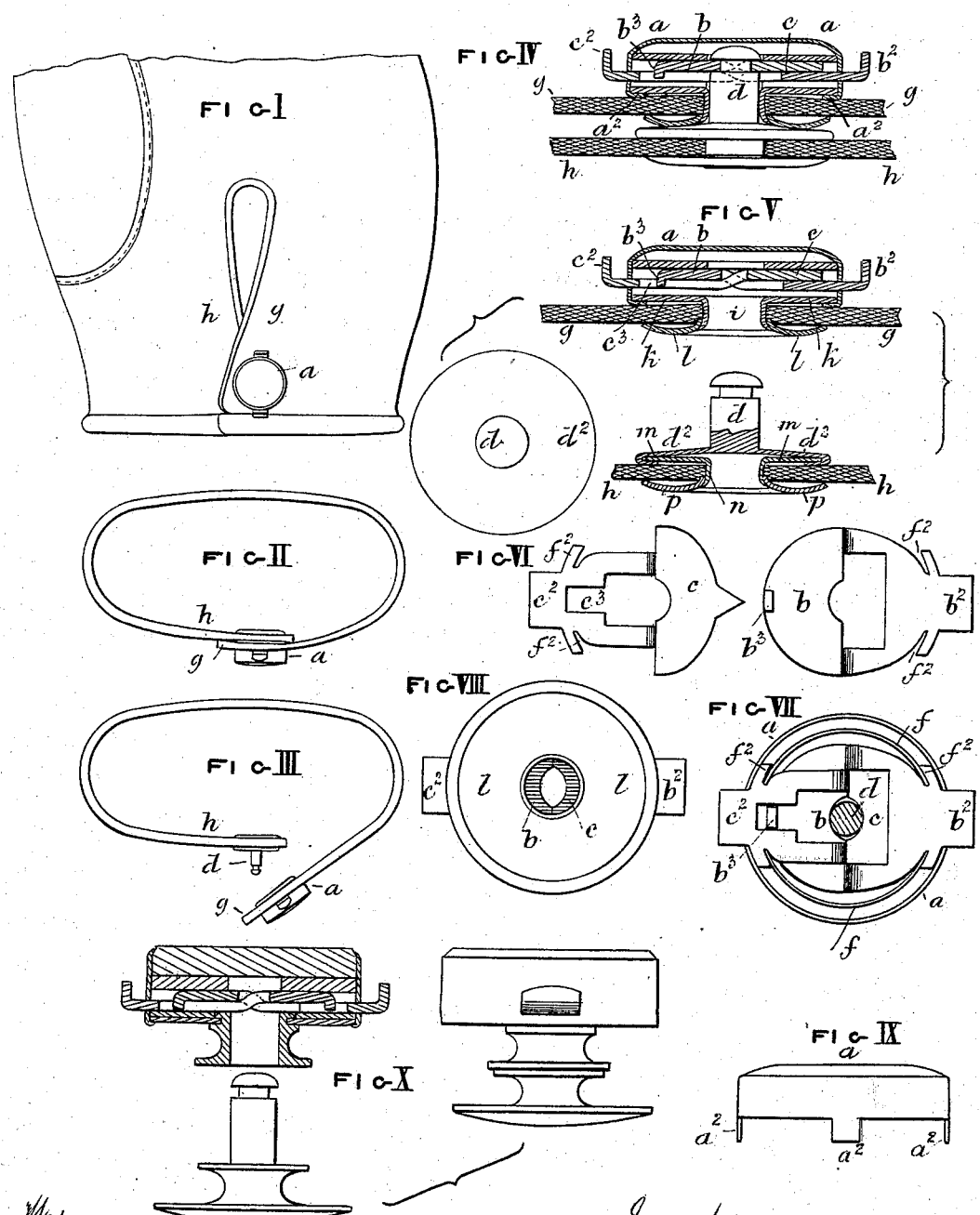

ELIJAH ATKINS, OF BIRMINGHAM, COUNTY OF WARWICK, ENGLAND.

IMPROVEMENT IN GLOVE AND OTHER FASTENINGS.

Specification forming part of Letters Patent No. 216,931, dated July 1, 1879; application filed May 9, 1879; patented in England, February 19, 1878, and February 4, 1879.

*To all whom it may concern:*

Be it known that I, ELIJAH ATKINS, of Birmingham, in the county of Warwick, England, manufacturer, have invented new and useful Improvements in Glove and other Fastenings, which improvements are fully set forth in the following specification, reference being had to the accompanying drawings.

My invention has reference principally to glove-fastenings, but may also be applied to the fastening of cuffs, sleeves, elastic bands, and other bands for umbrellas, purses, pocket-books, dress-belts, and the like.

I will describe and illustrate my invention as applied to a glove-fastening, and a solitaire for fastening cuffs, sleeves, and the like.

My said invention consists of the improvements hereinafter described in solitaires for fastening gloves, cuffs, sleeves, and other articles, and further, of the additions to solitaires hereinafter described for connecting them to the edges of the gloves and other articles, and for facilitating and insuring the proper fastening of the gloves or articles.

The solitaires which I use are made in two parts, one part consisting of a disk-like shell or hollow body containing two griping-plates of peculiar construction pressed together by springs, and also pushers for releasing the fastening, and the other part of the solitaire consisting of a stem upon the head of which the griping-plates close to fasten the two parts together.

Figure 1 represents in front elevation, and Fig. 2 in end elevation, a portion of a glove to which a fastening made according to my invention is applied; and Fig. 3 represents the same view as Fig. 2 with the two parts of the fastening disconnected from each other. Fig. 4 represents the fastening in section, drawn to a larger scale, the two parts being represented connected together; and Fig. 5 represents the same with the parts disconnected from one another. Fig. 6 represents the two griping-plates of the fastening detached. Fig. 7 represents in plan the shell part of the fastening with a portion removed, and exhibits the manner in which the two griping-plates gripe or close upon the head of the stem part. Fig. 8 is a plan of the under side of the shell part; and Fig. 9 represents the shell or hollow body separately.

The same letters of reference indicate the same parts in the several figures of the drawings.

I will first describe the glove-fastening. $a$ is the shell or hollow part of the solitaire, containing the two griping-plates $b$ $c$, the said plates crossing and working upon one another. The plate $b$ has a stud, $b^3$, which works in the guide-slot $c^3$ in the other plate, $c$; or both plates may have guiding-studs and slots. $b^2$ $c^2$ are the pushers of the said griping-plates, projecting from the edge of the shell part $a$. The pushers $b^2$ $c^2$ are made in one piece with their respective griping-plates. Each griping-plate $b$ $c$ consists of a nearly semi-elliptical disk, in the straight edge of which is a notch, the two notches closing upon and griping the head of the stem part $d$ of the solitaire.

The two half-disks or griping-plates $b$ $c$ are pressed together by the steel springs $ff$ (see Fig. 7) engaging with the ears $f^2$ $f^2$ on the said griping-plates.

By separating the straight edges of the two griping-plates $b$ $c$, by the action of the stem $d$ passing between them, or by pressure upon the pushers $b^2$ $c^2$, the two springs $ff$ are bowed or expanded, and their elasticity tends to force the straight edges of the said plates $b$ $c$ together.

The back part of the solitaire consists of a central stem, $d$, having a head, with which the notched middle parts of the griping-plates $b$ $c$ engage, as best seen in Fig. 7.

For the purpose of connecting the shell or body part $a$ of the solitaire to the edge $g$ of the glove, I construct the parts in the following way: I take the tubular shank $i$, having at its top the disk or flange $k$, which disk or flange constitutes the bottom or covering plate of the shell or body $a$, containing the griping-plates $b$ $c$ and pushers $b^2$ $c^2$ of the fastening. Having passed the shank $i$ through a hole in the edge $g$ of the glove, the said shank $i$ and its disk or flange $k$ are secured to the said glove by means of the convex pierced collar or flange $l$, the said collar or flange $l$ being connected to the bottom of the tubular shank $i$ by the closing or expanding of the edge of the latter upon the edge of the former in the manner represented in Figs. 4 and 5. The hollow shank $i$ and the bottom or covering plate $k$ of the shell part $a$ are thus connected to the glove.

The edge of the shell or body $a$ is provided with ears or projections $a^2$ $a^2$ (best seen in Fig. 9) for fastening it to the bottom or covering plate $k$. The shell or body part $a$ of the solitaire thus consists of three detached parts, namely: of a tubular shank, $i$, having at its top a disk-like covering-plate, $k$, for forming the bottom of the shell or body $a$, and the shell or body $a$, containing the griping-plates and pushers.

In connecting the parts described to the edge $g$ of the glove, the tubular shank $i$ is first passed through the glove from the outer side thereof, and the under disk or ring, $l$, is next passed onto the projecting end of the said shank $i$, and the said end of the shank expanded or closed upon the said under disk or ring, $l$. The shank $i$ is thus connected to the glove by collars or flanges $k$ $l$ on opposite sides of the edge of the glove. The shell $a$, containing the fastening mechanism, is next secured to the covering plate or bottom $k$ by closing the ears or projections $a^2$ on its edge around the edge of the said covering plate or bottom $k$. The connection of the shell or body part of the glove-fastening to the glove is thereby completed. I secure the stem part $d$ of the fastening to the opposite edge, $h$, of the glove in a similar manner. This part of my invention will be understood by referring to Fig. 5.

I provide the base of the stem $d$ with a disk, $d^2$, and to the edge of the said disk $d^2$, I connect, by a closing operation, the edge of the collar or flange $m$ of the tubular shank $n$. The base $d^2$ of the stem $d$ having been thus connected to the tubular shank $n$, the latter is passed through the hole in the edge $h$ of the glove from the upper side, and the said tubular shank is fastened in its place by closing the end of the said shank upon the ring or flange $p$, situated on the under side of the glove, in the manner described with respect to the tubular shank $i$ of the shell part $a$ of the fastening. The shank part $d$ of the fastening is thereby connected to the edge of the glove. By connecting the stem part to the edge of the glove in this way the said edge is made so rigid that it cannot fold or double up and interfere with the action of the fastening.

To fasten the glove the edge $g$, carrying the shell or body part $a$, is brought over the opposite edge, $h$, containing the stem part $d$, and by pressure upon the said part $a$ it passes onto the stem $d$, which stem forces back the griping-plates $b$ $c$, and when the shell part has reached its proper position the said griping-plates $b$ $c$ snap upon the head of the said stem, as illustrated in Figs. 1, 2, and 4, and the two edges of the glove are fastened very securely together.

In the act of fastening the glove the convex under collar or flange, $l$, of the shell part $a$ slides over or upon the upper flange part, $d^2$, of the stem $d$, and the shell part passes without obstruction from the edge of the glove onto the said stem, as before described. By pressure upon the pushers $b^2$ $c^2$ the griping-plates $b$ $c$ are withdrawn from the head of the stem $d$, and the glove is unfastened.

I apply my invention to the fastening of bands, purses, pocket-books, dress-belts, and other articles, substantially in the manner described with respect to the glove-fastening.

Fig. 10 represents, in section and elevation, a solitaire for fastening cuffs, sleeves, or other articles, the head or shell part of which contains griping mechanism constructed in the manner before described, excepting that both the griping-plates are furnished with studs and guiding-slots.

Having now described the nature of my invention and the manner in which the same is to be performed, I wish it to be understood that I claim as my invention of improvements in glove and other fastenings—

1. The combination, in a glove or other fastener, of two griping-plates crossing and working one upon the other, as shown, and springs for pressing the same together, one or both of said plates having a stud working in a guide-slot in the other, substantially as described.

2. A fastening for gloves and other articles, consisting of two parts, one part being composed of a hollow body, two griping-plates crossing and working upon each other, as shown, provided with pushers for releasing the fastening, and two springs formed of bowed strips of metal engaging with ears on said plates to press them together, and the other part being a stem with a head, upon which the aforesaid griping-levers close to fasten the two parts together, substantially as described.

3. The combination, with the hollow body of a fastening and the griping-plates located inside thereof, of a disk attached to and forming the bottom of said hollow body, a tubular shank formed in one piece with said disk, and a convex pierced collar secured to the bottom of the tubular shank by closing the edge of the latter upon it, substantially as described.

ELIJAH ATKINS. [L. S.]

Witnesses:
RICHARD SKERRETT,
HENRY SKERRETT,
*Both of 37 Temple Street, Birmingham.*